Oct. 1, 1968     J. A. LIPSCOMBE     3,403,560
THERMOSTAT ELEMENTS
Filed Aug. 8, 1967     3 Sheets-Sheet 1
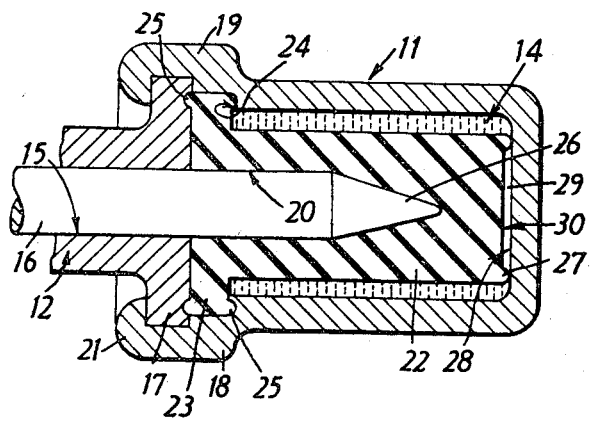
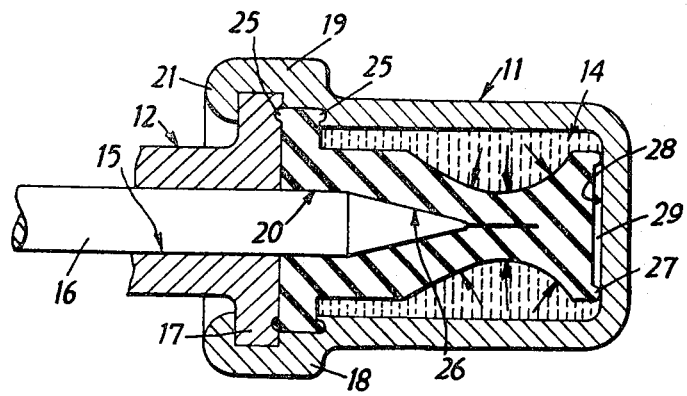

Oct. 1, 1968                J. A. LIPSCOMBE                3,403,560
                            THERMOSTAT ELEMENTS
Filed Aug. 8, 1967                                   3 Sheets-Sheet 2

United States Patent Office 3,403,560
Patented Oct. 1, 1968

3,403,560
THERMOSTAT ELEMENTS
John A. Lipscombe, Ashford, near Staines, England,
assignor to Walton Engineering Company Limited,
London, England, a company of Great Britain
Filed Aug. 8, 1967, Ser. No. 659,169
Claims priority, application Great Britain, Aug. 11, 1966,
36,078/66
5 Claims. (Cl. 73—368.3)

ABSTRACT OF THE DISCLOSURE

A wax filled thermostat element has a plunger with a tapered end that fits into a tapered bore of a rubber or like intermediate element. When the wax expands the plunger is forced outwardly. The end of the intermediate member remote from the plunger seals against the end wall of the element housing.

---

Figure 3:
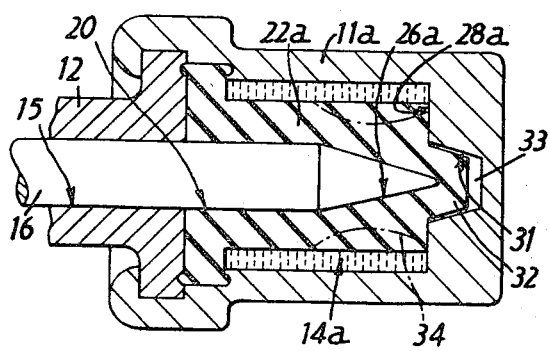

This invention relates to thermostat elements.

This invention is concerned with a thermostat element of the kind comprising a chamber containing temperature sensitive wax, such as petroleum wax; a plunger bore of smaller dimensions than the chamber; a plunger slidable within the bore, and projecting into the chamber, the end of the plunger within the chamber being tapered; and an intermediate member of a rubber or a similar resilient material within the chamber, the intermediate member having a tapered bore which receives the tapered end of the plunger and being arranged so that on expansion of the wax, the intermediate member forces the plunger outwardly of the chamber. Such a thermostat element is hereinafter referred to as a thermostat element of the kind specified. Such thermostat elements are usually arranged in use to operate against a return spring which normally holds the plunger in its innermost position within the intermediate member.

This invention provides according to one of its aspects a thermostat element of the kind specified wherein the end of the intermediate member that is more remote from the plunger bore seals against the adjacent end wall of the chamber.

Preferably the said end of the intermediate member and the said end wall define an air space which is free of said temperature sensitive wax. Preferably the said end of the intermediate member has an annular rim which seats against the said end wall and encloses the said air space that is free of wax. Alternatively, the thermostat element has a recess in the said end wall and the said end of the intermediate member has a flat end surface which rests on the said end wall covering the recess to form therewith the air space and sealing against the end wall along an annular path.

Alternatively the said end wall of the chamber may have a converging frusto-conical recess in the said end wall and the said end of the intermediate member having a complementary shaped projection received in the said recess, which projection is of less axial height than the recess so as to define the said air space between the end of the projection and the base of the recess. According to another aspect of this invention there is provided a thermostat of the kind specified further comprising a second plunger bore aligned with the first mentioned plunger bore, a second plunger received within the second plunger bore and projecting into the chamber; a second tapered bore formed in the intermediate member, aligned with the first mentioned tapered bore, and receiving the tapered end of the second plunger; the arrangement being such that on expansion of the wax, the intermediate member forces both plungers outwardly of the chamber. The end of the intermediate member through which the second bore projects preferably seals against the adjacent end of the chamber. The means of sealing is preferably as described in the preceding paragraphs.

Embodiments of the invention will now be described, by way of example, with reference to the accompanying drawings.

Figure 8:
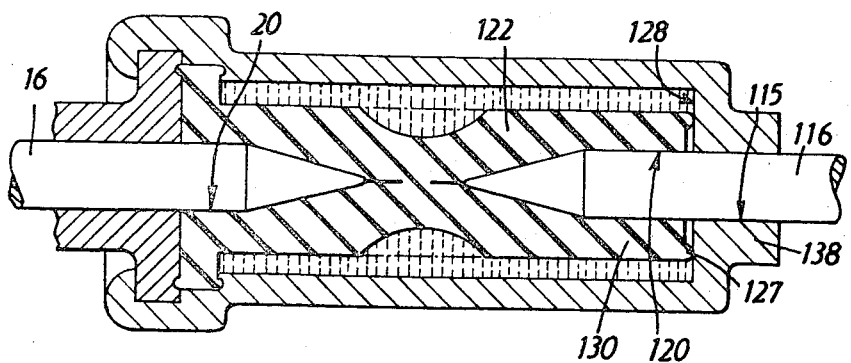

In the drawings:

FIGURE 1 is a scrap section along a longitudinal plane through a thermostat element of the invention, the parts being shown in the "cold" condition, FIGURE 2 is a similar section showing the part under the "hot" condition, FIGURE 3 is a view similar to FIGURE 1 of another thermostat element of the invention, FIGURES 4, 5, 6 and 7 are detail views of thermostat elements of the invention illustrating different end sealing arrangements, and FIGURE 8 is a view similar to FIGURE 1 of a thermostat element of the invention.

Referring now to FIGURES 1 and 2, a thermostat element of the invention has a head or housing 11 and a body 12 (which is shown partially broken away). The head 11 defines internally a cylindrical chamber 14 which contains a petroleum wax. The petroleum wax may contain copper powder or other metal powder or a grid as described in my co-pending patent application No. 456,916 to improve its thermal conductivity.

The body 12 has an internal bore 15 which is of smaller diameter than the chamber 14 and which contains a cylindrical plunger 16 that extends into the chamber 14. At its end adjacent to the head 11, the body 12 has externally a flange 17.

The head has a short external flange 18 having an upstanding rim 19 within which the flange 17 of the body 12 is received. The rim 19 is rolled over at its free end 21 to hold the body 12 on to the head 11.

Within the chamber 14 there is a cylindrical intermediate member 22 made of rubber or rubber-like material. This member 22 has a flange 23 that rests against the flange 17 and is held thereagainst by a step 24 in the side of the body 11. Annular rims 25 are provided respectively on both faces of the flange 23 and these rims 25 are received within corresponding grooves in the step 24 and in the flange 17 to assist in holding the intermediate member 22 accurately in position.

The intermediate member 22 has a bore 20 which at its inner end 26 tapers towards a point. The inner end of the plunger 16 is similarly shaped so as to be snugly received within the bore 20. The features thus far described are common to all the embodiments of the invention described herein and illustrated.

At its free end 30, the intermediate member 22 is provided with an annular rim 27 at its periphery. This rim 27 seals against the flat end wall 28 of the chamber 14. The rim 27 defines with the adjacent end wall of the member 22 and the face 28 an air space 29 which is free of petroleum wax.

In use, the thermostat is arranged to react to variations of temperature and to move the plunger 16 axially against the bias of springs (not shown) when the temperature sensed increases sufficiently to cause the petroleum wax to expand. Normally, however, the springs hold the plunger 16 in its innermost position fitting into the bore 20 of the member 22 as shown in FIGURE 1.

When the temperature being sensed increases, the compressive force of the expanding wax around the intermediate member at the location of the tapering end of the plunger 26 forces the plunger axially out of the member 22. The position taken up by the plunger 16 under the distortion of the intermediate member 22 and its bore 20 is shown in FIGURE 2.

As described above, the rim 27 seals lightly against the end wall 28 of the head 11. When, however, the wax expands, the force of the wax urges the rim 27 into closer sealing relationship with the face 28 so as to ensure that no petroleum wax should enter into the air space 29.

Because of the fact that the free end 30 of the intermediate member 22 is not subject to pressures due to the expanding wax, the possibility that the intermediate member should split along its axis is greatly reduced.

The wax and the intermediate member can be introduced into the head 11 in any convenient way. Preferably, however, the wax is pre-moulded onto the intermediate member and the moulded assemblage of intermediate member and wax cylinder is inserted into the body 11. In this way the ingress of petroleum wax into the space 29 during manufacture is obviated.

In the thermostat element illustrated in FIGURE 3, the end wall 28a of the chamber 14a is thickened and has a converging frusto-conical recess 31 axially with the bore 15 of the body 12. The mouth of the recess 31 has a smaller diameter than the intermediate member 22a. The intermediate member 22a has a frusto-conical projection 32 which is received in recess 31. The axial height of the projection 32 is less than that of the recess 31 so that there is an empty portion 29a of the recess that forms an air space. The tapered end 26a of the bore 20a of the intermediate member 22a extends to near to, into line with or preferably, as shown, beyond the end wall 28a. The cone angle of the recess 31 is slightly smaller than the cone angle of the tapering end of the plunger 26.

In use the thermostat element is arranged to operate in the same way as the first described embodiment as are all the other embodiments save that of FIGURE 8. As the wax expands, the intermediate member 22a is caused to be compressed to take up the shape indicated by chain lines 34. Thus as the plunger 16 is forced outwardly, the projection 32 is forced deeper into the recess 31. This compresses the material of the projection 32. The fact that the propection 32 is thus compressed and that there is no wax in the air space 29a which would get against the underside of the projection, obviates or at least minimizes the possibility of failure of the intermediate member.

Figure 4:
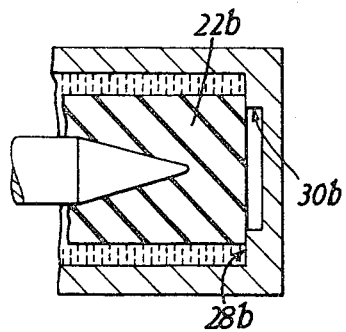

The intermediate member 22b of the thermostat element of FIGURE 4 has a flat end face 30b. The end wall 28b has a cylindrical recess 31b of smaller diameter than the intermediate member 22c. The end face 35b of the intermediate member 22b seats on the wall forming an annular sealing path around the recess 31b. An air space 29b is formed by the recess and the end face 35b.

Figure 5:
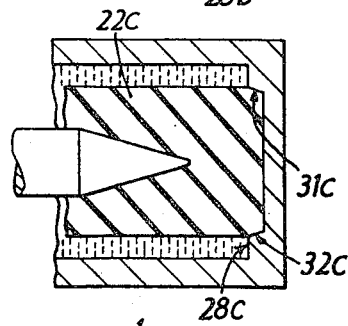

The end wall 28c of the thermostat element of FIGURE 5 has a converging frusto-conical recess 31c, the open mouth of which is of the same diameter as the intermediate member 22c. The end 32 of member 22c is similarly tapered and fits the recess 31c with its end face bearing against the base of the recess 31c.

Figure 6:
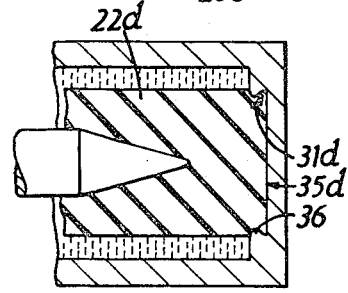

The end wall 28d of the thermostat element of FIGURE 6 has a cylindrical recess 31d. This recess 31d which is of the same diameter as the intermediate member 22d has a beaded lip 36 running around its mouth. The intermediate member 22d has a flat end 35d and a circumferential groove in which the beaded lip 36 is tightly received when the end face 35d bears against the base of the recess 31d.

Figure 7:
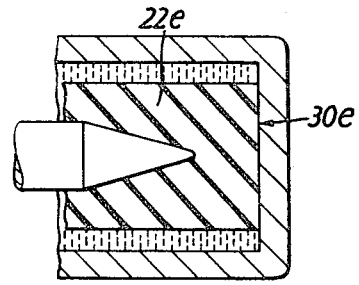

A degree of sealing can also be obtained between a flat end 30e of an intermediate member 22e which is pressed flush against the end wall 28e of the chamber 14 as shown in FIGURE 7. The intermediate member 22e is placed under axial pressure to prevent seepage of wax between the ends 35 and 28.

Reference is now made to FIGURE 8. The thermostat element therein shown has a second tapered plunger 116 aligned with plunger 16. The second plunger 116 is received in a bore 120 in the cylindrical intermediate member 122 aligned with bore 20 passes through a second plunger bore or passage 115 through a boss 138 formed on the end of the head 11 remote from the plunger 16.

The end 130 of the intermediate member 122 remote from plunger 16 seals against the end wall 128 of the chamber 114. This sealing may be effected by any of the means described above particularly with reference to FIGURES 1, 4, 5, 6 and 7. In this embodiment, the end 130 of the intermediate member 122 has an annular rim 127 which seals against the end wall 128.

This thermostat element operates in the same way as a tandem pair of elements. On expansion of the wax, the intermediate member 122 is deformed as shown in FIGURE 8 and both plungers 16 and 116 are forced outwardly of the element.

I claim:

1. A thermostat element of the kind comprising a chamber containing temperature sensitive wax, a plunger bore of smaller dimensions than the chamber; a plunger slidable within the bore, and projecting into the chamber, the end of the plunger within the chamber being tapered; and an intermediate member of a rubber or a similar resilient material within the chamber, the intermediate member having a tapered bore which receives the tapered end of the plunger and being arranged so that on expansion of the wax, the intermediate member forces the plunger outwardly of the chamber, the end of the intermediate member that is more remote from the plunger bore defining an air space with the adjacent end wall of the chamber which air space is free of said temperature sensitive wax.

2. A thermostat element of the kind comprising a chamber containing temperature sensitive wax, a plunger bore of smaller dimensions than the chamber; a plunger slidable within the bore, and projecting into the chamber, the end of the plunger within the chamber being tapered; and an intermediate member of a rubber or a similar resilient material within the chamber, the intermediate member having a tapered bore which receives the tapered end of the plunger and being arranged so that on expansion of the wax, the intermediate member forces the plunger outwardly of the chamber, the element further comprising a second plunger bore aligned with the first mentioned plunger bore; a second plunger received within the second plunger bore and projecting into the chamber; a second tapered bore formed in the intermediate member, aligned with the first mentioned tapered bore, and receiving the tapered end of the second plunger; and an annular rim on the end of the intermediate member through which the second plunger projects which rim seats against the adjacent end of the chamber to form an air space which is free of said temperature sensitive wax.

3. An element as claimed in claim 1 in which the said end of the intermediate member has an annular rim which seats against the said wall and encloses the said air space that is free of wax.

4. An element as claimed in claim 1 having a recess in the said end wall and in which the said end of the intermediate member has a flat end surface which rests on the said end wall covering the recess to form therewith the air space and sealing against the end wall along an annular path.

5. An element as claimed in claim 1 having a converging frusto-conical recess in the said end wall, the said end of the intermediate member having a complementary shaped projection received in the said recess, which projection is of less axial height than the recess so as to define the said air space between the end of the projection and the base of the recess.

References Cited

UNITED STATES PATENTS

| 2,806,375 | 9/1957 | Wood | 73—368.3 |
| 2,806,376 | 9/1957 | Wood | 73—368.3 |

FOREIGN PATENTS

| 1,037,722 | 8/1958 | Germany. |
| 563,795 | | Belgium. |

DAVID SCHONBERG, *Primary Examiner.*

WILLIAM HENRY II, *Assistant Examiner.*